TRACK-HOLD CIRCUITRY HAVING WIDE BAND-WIDTH RESPONSE

Filed Dec. 1, 1966

*INVENTORS*

GEORGE HANNAUER III
THOMAS A. FYFE

BY

THEIR ATTORNEY

United States Patent Office 3,506,922
Patented Apr. 14, 1970

3,506,922
TRACK-HOLD CIRCUITRY HAVING WIDE BAND-WIDTH RESPONSE

George Hannauer III, Pennington, and Thomas A. Fyfe, Oakhurst, N.J., assignors to Electronic Associates, Inc., Long Branch, N.J., a corporation of New Jersey
Filed Dec. 1, 1966, Ser. No. 598,329
Int. Cl. H03k 5/53
U.S. Cl. 328—151 9 Claims

ABSTRACT OF THE DISCLOSURE

A track-hold circuit for an analog computer is formed of an amplifier and a first capacitor adapted to be switched into a feedback relation therewith, this first capacitor having a relatively small capacitance; a second capacitance is provided to also be switched into feedback relation with the amplifier, this second capacitor having a large capacitance relative to the first capacitor; and a switching circuitry is coupled to the amplifier and the first capacitor and through a delay circuit to the second capacitor such that when the track-hold circuit is switched from the track mode to the hold mode, the first capacitor is immediately switched into its feedback relation with the amplifier but the second capacitor is switched into such a feedback relation only after a finite duration of time such that, for short hold mode durations, the second or high valued capacitor is not employed in the circuit.

This invention relates to track-hold circuitry for use in analog computation and more particularly to such circuitry adapted to track a high speed variable signal and also to store such a signal for a relatively long duration without excessive voltage drift effects.

Track-hold circuits, which are also referred to as sample-store circuits, are adapted to receive a variable input signal and at any particular point in time to be set to provide an output signal of a voltage magnitude representative of the input signal at that given point in time. Such circuits have a number of applications in analog computers. For example, in analog-to-digital conversion it is necessary to periodically sample the analog signal and to fix or hold the magnitude of that signal for a given length of time while the corresponding digital signal is being generated since, by definition, an analog signal is a continuously varying signal while digital signals are discrete pulses or groups of pulses. Track-hold circuits are also employed in many types of computations such as in iterative processes, for example where the solution of a difference equation involves a repeated exchange of sampled data with selected analog computing elements.

Track-hold circuits are basically of the form including an amplifier having a resistance in a feedback path relation and also a capacitor connected in parallel therewith, there being appropriate gates or switches such that the capacitor is electrically disconnected during the tracking or sampling mode with the capacitor being connected to the input to the amplifier during the hold or storing mode. When the circuit is placed in the track mode, the voltage across the capacitor will vary as a direct function of the input signal to the circuit and when the circuit is placed in the hold mode, the capacitor stores the last input value that was presented to the circuit. For tracking high speed variables, it is essential that the circuit have a fast time response and therefore employ a small valued capacitor. However, such small valued capacitors tend to permit considerable drift when the circuit is in the store mode. For this reason, certain prior art track-hold circuits have been provided with two or more capacitors having different capacitive values, a particular one of which is selected according to whether the circuit is tracking a high speed signal and storing it for a short period of time or tracking a low speed signal and storing for a long period of time. However, with such an arrangement, it is not possible to track high speed variables accurately and then store the results for a long period of time such as several seconds. Furthermore, in switching from high speed operation to low speed operation, it is possible for the information stored in a high speed circuit to be lost.

It is then an object of the present invention to provide an improved track-hold circuit for use in analog computers.

It is another object of the present invention to provide a track-hold circuit for an analog computer which is adapted to track or follow variable input signals varying at a high frequency and yet to store a given magnitude of such a signal for a long period of time.

It is still another object of the present invention to provide an improved track-hold circuit that is adapted to sample a highly varying signal and store the magnitude thereof for a relatively long period of time which circuitry is adapted to retain the stored signal during changes of operational modes.

In the present invention, a track-hold circuit is provided which includes an amplifier with a resistance in a feedback path and also a capacitance in another feedback path, this first capacitor having a relatively small value. Both the resistor and the capacitor are each coupled to the input terminal of the amplifier through electronic gates or switches which may be placed in either conductive or nonconductive condition and the junction between the respective resistor and capacitor and the corresponding gates are also coupled to the ground through additional gates. The input signals to be summed and tracked are supplied to the junction between the resistor and its respective gates and the respective gates are coupled to a control signal source such that either the resistance is coupled to ground and the capacitor is coupled to the input terminal of the amplifier or the capacitor is coupled to ground and the resistance is coupled to the input terminal of the amplifier. The arrangement of the circuitry possesses a certain symmetry which is useful in minimizing transients which might occur at the time of switching from a track mode to a hold mode or vice versa. The circuitry thus described is well-known in prior art.

In accordance with the present invention, a second capacitor having a capacitance value substantially greater than that of the first capacitor is coupled in parallel with the first capacitor through an appropriate gate and also through a second gate to ground. This latter gate is connected to the control signal source such that the capacitors will be grounded simultaneously during track mode of the circuit. The control signal source is coupled to the first mentioned switch through a delay circuit that operates in one direction only such that when the circuitry is switched from the track mode to the store mode, the low valued capacitor starts to store immediately while the high valued capacitor continues to track for a period of time equal to the delay time. However, when the circuitry is switched from the store mode to the track mode, both capacitors start to track immediately. In this manner, if the time duration of the store mode is relatively small, and less than the above described delay time, then the large valued capacitor is always in a tracking mode and does not contribute to the circuit. However, when the store period is relatively long, the high valued capacitor will be charged to the same voltage as the low valued capacitor to minimize the voltage drift that normally would be associated therewith.

A feature then of the present invention resides in a track-hold circuitry employing both a low valued capacitor in parallel connection and appropriate gate means to place the capacitors in either track mode or store mode with a control signal source being coupled to the high valued capacitor through a signal delaying means having a sufficient delay time duration such that for short store periods, the high valued capacitor remains in the tracking mode and is placed in store mode when the store period is to be of a relatively long duration. Thus, a track-hold circuitry is provided having a tracking capacitor of relatively low capacity value and thus quick response to a quickly varying signal and a high valued capacitor for employment during relatively long store periods which high valued capacitor is nevertheless not placed in the circuit for relatively small store periods.

These and other objects, advantages and features of the present invention will become more readily apparent from the following disclosure when viewed in conjunction with the drawings wherein.

Figures 1, 2:
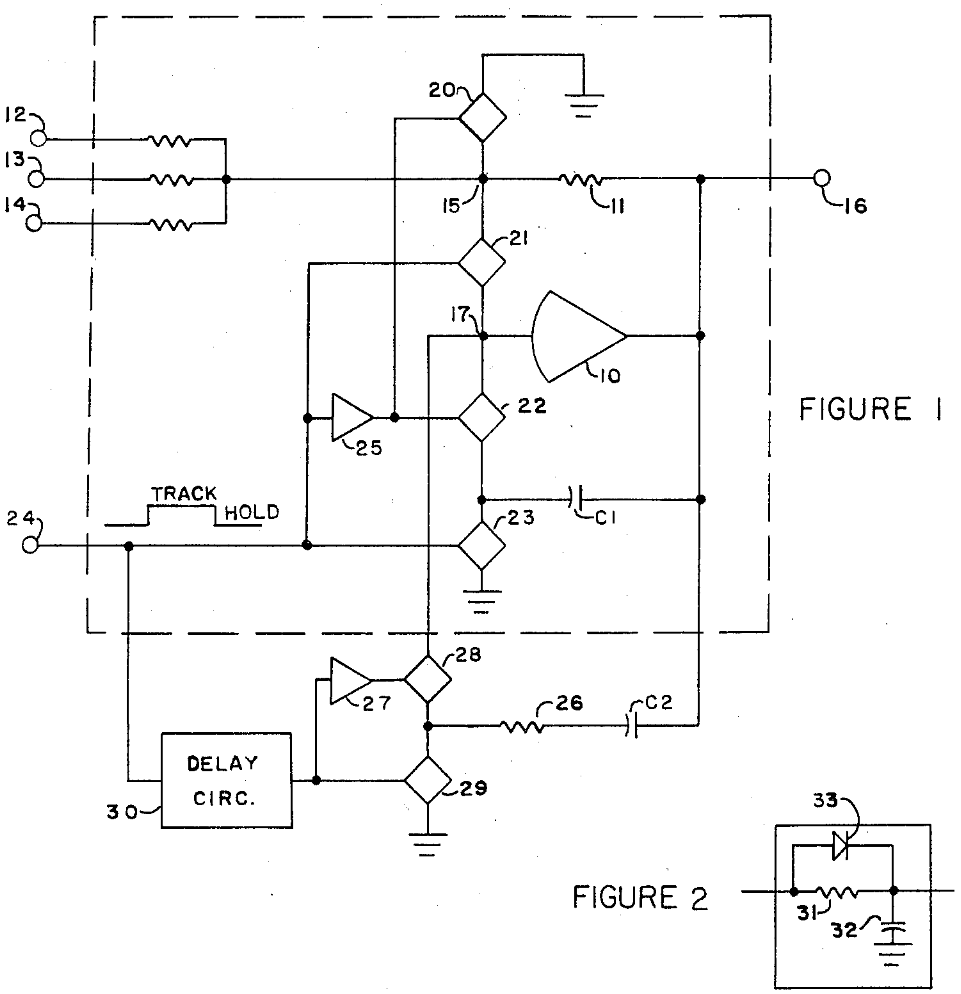
FIGURE 1 is a schematic diagram of a track-hold circuitry of the present invention.
FIGURE 2 is a schematic diagram of a particular delay circuitry that might be employed with the present invention.

Referring now to FIGURE 1, the track-hold circuitry of the present invention is illustrated as comprising a basic track-hold circuit as well as the improvements of the present invention. The basic track-hold circuit is illustrated in FIGURE 1 as being enclosed by dashed lines and this portion of the circuitry will be first described in order to provide a better understanding of the present invention.

As illustrated in FIGURE 1, operational amplifier 10 is provided with resistor 11 in a feedback path relation between the input junction 17 and output terminal 16 of the amplifier and one or more input terminals 12, 13 and 14 are adapted to supply varying input signals to summing junction 15. It will be understood by those skilled in the art that the output signal appearing at terminal 16 will be representative of the sum of the input signals except that the output signal will be of opposite sign or inverted relative to the input signals. During a normal tracking operation, resistance 11 is maintained in the feedback path of amplifier 10 by electronic switch or gate 21 which is in a conductve condition during the tracking operation. Capacitor $C_1$ is connected to the output terminal of amplifier 10 and adapted to be coupled in a feedback relation with amplifier 10 by way of electronic switch or gate 22 which is placed in a conducting condition during a hold operation but is not conductive during a normal track operation during which capacitor $C_1$ is coupled directly to ground by way of gate 23. During the hold or store mode of operation, summing junction 15 is coupled directly to ground by means of gate 20.

During the tracking operation, gates 21 and 23 are conducting and gates 20 and 22 and 22 are non-conducting while, during a hold or store operation, gates 20 and 22 are conducting while gates 21 and 23 are not conducting. Thus, to provide the appropriate control of the respective gates, a single two state binary signal can be employed wherein the high voltage level of the signal is representative of the track command while the low voltage level is representative of the hold command. In FIGURE 1, the signal is supplied to control terminal 24 and directly to gates 21 and 23 such that, during the track-mode, gates 21 and 23 are placed in a conductive condition. During this time, the signal is also supplied to inverter 25 to provide a low state binary signal to gates 20 and 22 to maintain them in a non-conductive condition. When the signal supplied to control terminal 24 is a low voltage level, gates 21 and 23 will be placed in a non-conductive condition while the low signal provided to inverter 25 will result in a high signal placing gates 20 and 22 in a conductive condition.

Thus, the operational mode of the circuitry will be determined by the control signal supplied to terminal 24 which will either be representative of the track mode or of the hold mode. During the track mode, the storage capacitor $C_1$ is disconnected from input terminal 17 of amplifier 10 by gate 22 and is directly coupled to ground by gate 23 while feedback resistor 11 is coupled in a feedback relation to input terminal 17 by way of gate 21. During this time, the output signal appearing at output terminal 16 will be representative of the sum of the input signals except that the output signal will be of opposite polarity. When the circuitry is in the track mode, capacitor $C_1$ can be said to be tracking the output signal since the voltage across the capacitor $C_1$ will just be of a magnitude equal to that of the output signal. When the circuitry is placed in a hold mode or a store mode, capacitor $C_1$ is switched into a feedback relation with amplifier 10 by gate 22 and at the same time will be disconnected from ground by gate 23. Also at this time, feedback resistor 11 is disconnected from input terminal 17 by gate 21 and is coupled to ground by gate 20. When the circuitry is in the hold mode, the voltage drop across capacitor $C_1$ is maintained by amplifier 10 such that the output voltage appearing at terminal 16 can be employed to drive the computing elements which constitute the next stage of the computer circuitry. When the circuit is again switched back to the track mode, resistor 11 is again coupled to input terminal 17 of amplifier 10 and capacitor $C_1$ is disconnected therefrom and coupled to ground to again continue the tracking operation.

In order to track quickly varying signals, the capacitance of capacitor $C_1$ should be relatively small in order to provide the appropriate response time. However, a small capacitance will rather quickly experience a voltage change should the circuitry be placed in the hold mode for a relatively long duration.

Rather than compromise between the respective requirements to be fulfilled by the track-hold circuit, the present invention is one in which storage capacitor $C_1$ is chosen to have a relatively small value of the order of a millimicrofarad and a second capacitor $C_2$ in series with a resistor 26, is adapted to be switched into the circuit when a hold period of a substantially long duration is required. The capacitance of capacitor $C_2$ is substantially larger than that of capacitor $C_1$ and is of the order of one microfarad. More importantly, when the circuitry of the present invention is switched from track mode to the hold mode, there is provided a short delay before capacitor $C_2$ is placed on a holding condition such that for very short hold periods, the capacitor $C_2$ will remain in a tracking condition and not affect the operation of the circuitry. That is to say, capacitor $C_2$ will be placed operationally in the circuit only when the hold mode is of a relatively long duration.

As illustrated in FIGURE 1, capacitor $C_2$ has one plate coupled to output terminal 16 and, its other plate being coupled to the resistor 26 and then to input terminal 17 of amplifier 10 by way of gate 28 and also to ground by way of gate 29. Gates 28 and 29 are so arranged in the circuit that gate 29 will be conducting during the track mode to thus couple capacitor $C_2$ to ground while gate 28 will be non-conducting during this period. During the hold mode gate 29 will be non-conducting while gate 28 will be conducting to place capacitor $C_2$ in a feedback path with operational amplifier 10. The operation of capacitor $C_2$, then, is similar to that of capacitor $C_1$ with one important difference.

When the circuitry of FIGURE 1 is switched from the hold mode to the track mode, both capacitors $C_1$ and $C_2$ are simultaneously grounded for tracking operation. However when the circuitry of FIGURE 1 is switched from the track mode to the hold mode, only capacitor $C_1$ is immediately placed in a feedback relation to operational amplifier 10. The control signal which effects this change of mode is supplied to gates 28 and 29 by way of delay circuitry 30 which delays the signal for approximately 10 milliseconds. Thus, when the hold period is required to be less than 10 milliseconds, capacitor $C_2$ will not be switched to a hold mode but will remain in a tracking mode with output signal being stored only by capacitor $C_1$. When the hold period is required to be of the order of magnitude of 10 milliseconds or longer, then capacitor $C_2$ will be placed in a storing condition to help stabilize the voltage across capacitor $C_1$, which stabilization results from the relatively high capacitive value of capacitor $C_2$. Delay circuit 30 is of a uni-directional nature to only delay the control signal when the circuitry switches from the hold mode to the track mode. This circuitry will be more fully described below.

During the tracking mode, the high voltage level control signal causes gate 29 to conduct thereby coupling capacitor $C_2$ to ground and this signal is also inverted by inverter 27 to place gate 28 in a non-conducting condition. When the circuitry is switched from the track mode to the hold mode, the signal supplied to gates 28 and 29 are delayed as explained above. When the circuitry is switched from the hold mode back to the track mode, the control signal is supplied to gates 28 and 29 at the same time as this control signal is presented to the other gates of the circuitry. A particular delay circuitry that might be employed in the present invention is illustrated in FIGURE 2 and includes resistor 31 coupled between input and output terminals of the circuit, the output terminal thereof being coupled to ground through capacitor 32. The unidirectional diode 33 is coupled in parallel relation with resistor 31 with the cathode of the diode being connected to the output terminal of the circuit and the anode being coupled to the input terminal such that when the input control signal to the circuit is at a high voltage level and is switched to a low voltage level, there will be a time delay of approximately 10 milliseconds while capacitor 32 discharges through resistor 31. However, when the input signal to the circuit of FIGURE 2 switches from a low voltage level to a high voltage level, capacitor 32 will be immediately charged through diode 33. Thus, this circuit provides a delay to a signal change from a high voltage level to a low voltage level but presents no delay to a signal change from the low voltage level to a high voltage level as required for employment in the present invention. Other types of delay circuits are well known in the art and may be employed as an alternative to the circuitry of FIGURE 2. For example, the delay circuitry could be in the form of a ramp generator driving a trigger circuit, the arrangement being placed in parallel with a unidirectional diode of the type illustrated in FIGURE 2 as diode 33.

Figure 3:
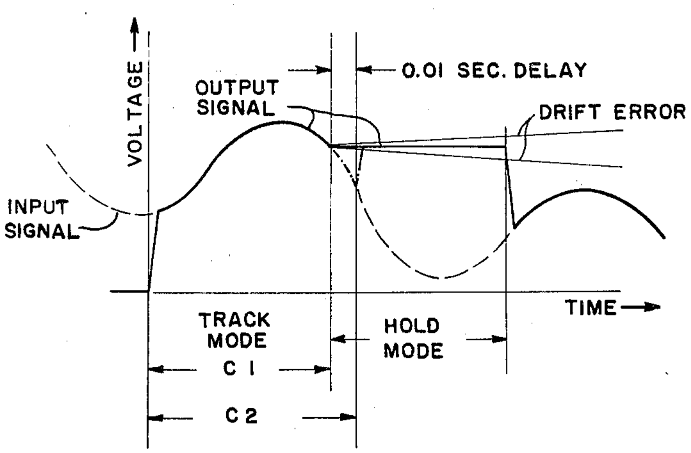
FIGURE 3 is a graph illustrating the operation of the circuitry in both track and hold modes.

To better describe the operation of the present invention, reference is now made to FIGURE 3 which is a graph illustrating the relationship between an input signal to the circuitry and the manner in which the output signal varies according to whether the circuitry is placed in the track mode or the hold mode. The variation of the input signal has been somewhat exaggerated to illustrate the actual tracking range of the circuitry of the present invention. When the circuitry is placed in the track mode, both capacitors $C_1$ and $C_2$ are immediately coupled to ground and the output signal follows the input signal. While the output signal will be of opposite polarity to that of the input signal, the output signal has been illustrated in FIGURE 3 as having the same polarity for a better comparison of the respective signals. When the circuitry is switched to the hold mode, capacitor $C_1$ is immediately coupled to amplifier 10 to store the value of input signal at that time. However, it will be remembered that capacitor $C_2$ is coupled to ground through a different circuit than that by which capacitor $C_1$ is so coupled for the tracking operation and thus, capacitor $C_2$ does not affect the time response of capacitor $C_1$ when it is placed in a hold operation. Depending upon the delay time of delay circuit 30, of FIGURE 1, capacitor $C_2$ will then be coupled to amplifier 10 approximately 10 milliseconds after capacitor $C_1$ is placed in the hold mode. Thus, it will be appreciated that when the hold mode duration is relatively short and less than 10 milliseconds, capacitor $C_2$ will not be employed in the hold mode. However, if the hold mode duration is to be of an order of magnitude of 10 milliseconds or greater, capacitor $C_2$ is then also placed in the hold mode as illustrated in FIGURE 3 to stabilize the output signal being stored and to minimize drift errors, the limits of which are illustrated in FIGURE 3 and representative of a track-hold circuit not employing the present invention. When the circuitry is again switched from the hold mode to the track mode, both capacitors $C_1$ and $C_2$ immediately start to track and the output signal of the circuitry again follows the variations of the input signal.

With the circuitry as shown in FIGURE 1, a preferred capacitance for capacitor $C_1$ is 0.003 microfarad while the preferred capacitance for capacitor $C_2$ is 1 microfarad. In order to allow capacitor $C_2$ to be switched into parallel relation with capacitor $C_1$ during the hold mode, without disturbing the voltage across capacitor $C_1$, resistor 26 of FIGURE 1 is chosen to have a value of 1 K ohm. This resistance also serves to limit the loading of amplifier 10 by the large capacitor $C_2$ during the track mode. Other current limiting means may be employed in place of resistor 26.

While only one principal embodiment of the present invention has been described and illustrated, it will be appreciated that variations and modifications thereof will occur to one skilled in the art, which variations and modifications nevertheless are to be considered as being within the scope of the present invention as claimed.

What is claimed is:

1. A track-hold circuit for an analog computer, said circuit comprising:

an amplifier having an input and an output;

a first capacitor connected to said output having a relatively small capacitance value;

a second capacitor connected to said output having a capacitance value that is relatively large compared to that of said first capacitor; and means including switch means and delay means connected to said input and to said first and second capacitors to switch said first capacitor into feedback relation with said amplifier and to switch said second capacitor to said feedback relation a finite period of time after the switching of said first capacitor.

2. A track-hold circuit according to claim 1 including a current limiter in series connection with said second capacitor to limit the current flow to or from said second capacitor.

3. A circuit according to claim 1 wherein said switching means includes means to simultaneously switch said first and second capacitors out of said feedback relation with said amplifier.

4. A circuit for tracking a varying voltage signal and storing a value of said signal for a finite period of time, said circuit comprising:

an amplifier having an input and an output;

a first capacitor connected to said output having a relatively small capacitance value;

a second capacitor connected to said output having a capacitance value that is relatively large compared to said first capacitance value;

switching means connected to said input and said first and second capacitors to switch said capacitors into a feedback relation with said amplifier, and means including delay means connected to said second capacitor so that said second capacitor is switched into feedback relation a finite period of time after the switching of said first capacitor.

5. A track-hold circuit according to claim 4 including a current limiter in series connection with said second capacitor to limit the current flow to or from said second capacitor.

6. A circuit according to claim 5 wherein said current limiter is a resistor of constant value.

7. A circuit for tracking a variable voltage signal and storing a value thereof for finite period of time, said circuit comprising:

an amplifier having an input terminal and an output terminal;

a resistor;

means connected to said resistor and to said amplifier to switch said resistor into parallel relation with said amplifier between said terminals;

a first capacitor having a relatively small capacitance value connected to said output terminal;

a second capacitor having a capacitance value that is relatively large compared to that of said first capacitor connected to said output terminal; and means including switching means and delay means coupled to said input terminal and to said first and second capacitors to switch said first capacitor into feedback relation with said amplifier and to switch said second capacitor to said feedback relation a finite period of time after switching of said first capacitor.

8. A circuit according to claim 7 wherein said switching means includes a gate connected between said resistor and said input terminal for disconnecting said resistor therefrom when said first capacitor is coupled in a feedback relation.

9. A circuit according to claim 7 wherein said switching means includes delay means to provide for the switching of said second capacitor into a feedback relation with said amplifier a finite period of time after switching of said first capacitor, and to switch said second capacitor out of a feed back relation with said amplifier simultaneously with the switching of said first capacitor out of a feedback relation.

References Cited

UNITED STATES PATENTS 3,381,231 4/1968 Gilbert ------------ 328—151

DONALD D. FORRER, Primary Examiner

H. A. DIXON, Assistant Examiner

U.S. Cl. X.R.

307—246